United States Patent
Gallagher

(12) 
(10) Patent No.: US 6,264,462 B1
(45) Date of Patent: Jul. 24, 2001

(54) POLYMER TRANSFER AND DEPOSITION MOLDING DEVICE

(76) Inventor: Robert M. Gallagher, 700 Conestoga Rd., Berwyn, PA (US) 19312

( * ) Notice: Subject to any disclaimer, the term of this patent is extended or adjusted under 35 U.S.C. 154(b) by 0 days.

(21) Appl. No.: 09/388,052

(22) Filed: Sep. 1, 1999

(51) Int. Cl.[7] ................................................ B29C 43/34
(52) U.S. Cl. ........................ 425/574; 425/257; 425/258; 425/448; 425/449; 425/DIG. 200; 425/DIG. 201; 141/233; 198/463.2; 198/463.3; 222/355
(58) Field of Search ........................ 425/257, 258, 425/447, 448, 449, 574, DIG. 200, DIG. 201, DIG. 202; 141/231, 232, 233; 198/463.2, 463.3; 137/899.1; 222/344, 355

(56) References Cited

U.S. PATENT DOCUMENTS

| 3,473,204 | 10/1969 | Ianuzzi et al. ........................ 425/449 |
|---|---|---|
| 3,877,862 | 4/1975 | Murray ................................. 425/488 |
| 4,971,544 | * 11/1990 | Scheeberger ........................ 425/258 |
| 5,006,188 | 4/1991 | Usui et al. ............................ 156/245 |
| 5,078,937 | 1/1992 | Eela ...................................... 264/109 |
| 5,185,117 | 2/1993 | Hawley ........................... 264/211.12 |
| 5,326,523 | 7/1994 | Gustavel et al. ...................... 264/257 |
| 5,354,526 | 10/1994 | Jost et al. ............................. 264/40.4 |
| 5,389,315 | 2/1995 | Yabushita ........................... 264/40.1 |
| 5,401,154 | * 3/1995 | Sargent ................................. 425/114 |
| 5,462,422 | 10/1995 | Gustavel et al. ................... 425/129.1 |
| 5,518,669 | 5/1996 | Kilsdonk ............................. 264/1.24 |
| 5,585,122 | 12/1996 | Drum et al. ........................ 425/182 |
| 5,672,403 | 9/1997 | Hara et al. ............................. 428/95 |
| 5,686,117 | 11/1997 | Snyder et al. ....................... 425/112 |
| 5,788,901 | 8/1998 | Barnard et al. ..................... 264/165 |
| 5,798,128 | 8/1998 | Dumazet et al. .................... 425/147 |
| 5,849,137 | 12/1998 | Hogge et al. ........................ 156/500 |

FOREIGN PATENT DOCUMENTS 361348   11/1931   (GB).

* cited by examiner

Primary Examiner—Nam Nguyen
Assistant Examiner—Joseph S Del Sole
(74) Attorney, Agent, or Firm—Dykema Gossett PLLC

(57) ABSTRACT

A polymer is plasticized in a plasticizing unit and is thereafter fed into a transfer device which is moved into alignment with a clamping press which is remotely located from the plasticizing unit. The polymer from the transfer device is deposited directly into a mold attached to the clamping press or is deposited on a carrier which moves into the mold. An impress preforming device allows the carrier deposited polymer to be shaped prior to entering the mold. Alternatively, the transfer device can be connected with a chamber which is capable of coating continuous or chopped fibers which are deposited on a carrier in a continuous or chopped manner. The carrier moves the fiber composite into the mold.

32 Claims, 17 Drawing Sheets

POLYMER TRANSFER AND DEPOSITION MOLDING DEVICE

FIELD OF INVENTION

This invention relates to a polymer transfer and deposition device and method for depositing plasticized polymers or polymer composites on multiple sets of molds by collecting the material in transfer chambers from a central plasticizing unit, and then depositing the contents from the transfer chambers into molds which are remote from the central plasticizing unit via either a direct deposit or through an intermediate carrier which moves the polymer into the molds. Continuous or various fiber lengths can be incorporated into the polymer using an attachment connected to the transfer chamber. Polymer deposited on a carrier can be formed to a specific shape while located over the mold.

BACKGROUND OF THE INVENTION

Plastic injection molding is a well established method for producing a wide variety of plastic parts. A melt charge is built in the plasticizing section, then injected under high pressure into a closed mold held in a clamping station which must resist the pressure. After a suitable cooling time, the mold is opened to eject the finished part. To reduce the pressure created in the mold, a series of hot runner, sequential valves were developed to allow the melt to flow over shorter distances within the mold cavity to create a complete part. As cavity pressure build-up is related to the melt flow distance during fill, reducing this flow length with multiple valve gates, reduced the cavity pressure. The necessary software upgrade and valve sequence controls have become available for this lower cavity pressure injection molding process.

In order to further reduce the cavity pressure, various processes were developed where molten plastic was deposited into an open mold of a vertical acting clamping press. In one technique, molten plastic was injected through a series of valve gates into the bottom, stationary platen side of a down acting clamping station to form a series of puddles. The press closes on the still fluid material to fill out the mold cavity. Another version prepared a melt charge in the injection side of molding machine. When a sufficient molten charge was prepared, the entire injection unit moved forward into a open mold, attached to a vertical clamp press. As the injection section retracted out of the mold, the melt charge was deposited into the open mold in a controlled manner. This deposition of molten polymer into an open mold helped to reduce the cavity pressure based on third power affect of the cavity wall thickness on pressure generation during a typical closed mold filling process. However, like standard injection molding machines, these lower cavity pressure machines were designed to prepare and deposit a molten charge of plastic into a mold using a similar integrated, cycle driven process. Their main advantage is the ability to produce larger parts at lower clamping pressures or to capture decorative surface materials that would not resist the higher cavity pressures of a standard injection molding machine.

In reference to glass fiber reinforced thermoplastics processing, one method, described in U.S. Pat. No. 5,185,117, issued Feb. 9, 1993, utilized a vertical press and a two stage extrusion process where long glass fibers were introduced downstream into the plastic. The molten composite was discharged into an integrally attached accumulator in the form of a continuous log. As needed, a set length of molten plastic was cut from the log and loaded into the mold of a vertical acting clamping press, using a suitable transfer device such as a robot.

As described in U.S. Pat. No. 5,798,128, issued Aug. 25, 1998, another glass fiber reinforced thermoplastic process involved melting a plastic in a twin screw extruder, then introducing glass fibers into the melt stream within the extruder which exited into an accumulation chamber attached to the end of the extruder. A second syringe shaped accumulator is aligned with and connected to the first accumulator. A shutter opened and molten plastic was pushed into the second accumulator. At a predetermined fill level, the shutter closed and the syringe shaped accumulator was moved by a robot to either an open vertical press or connected to the fill port of a closed mold. Melt was pushed out of the same port opening used to fill the accumulator.

It is a feature of this invention to be able to produce polymer composites whereby collection devices carry polymer from a central plasticizing supply to clamping stations where the polymer can be directly deposited in the mold or transported via an intermediate carrier into the mold. This low pressure molding process allows inserts to be incorporated on the surface, as a core material or combined to form a finished product.

It is a further feature of the invention that the collection devices can transfer polymer into another chamber designed to accept and mix continuous fibers, chopped fibers or various combinations of chopped and continuous length fibers with the polymer using a continuous or discontinuous process. Surface materials and/or cores can be incorporated in the polymer composite.

Still another feature of the invention which allows the carrier deposited polymer or polymer composite to be shaped over the mold using compression dies that capture and form the polymer to produce a desired profile before placement in a mold.

SUMMARY OF THE INVENTION

A polymer is fed into a plasticizing machine such as an extruder for continuous mixing or a batch type processing machine for discontinuous mixing. Additives can be blended into the polymer during the mixing phase. The discharged polymer is deposited into a transfer device that is separate from and not integrally attached to the plasticizing machine. A swing clamp or other suitable device lifts and rotates a fill port located on top of the transfer device. Where a continuous stream of polymer is being discharged, a dual feed manifold or diverter device switches the polymer from a filled transfer chamber to another transfer device. The transfer devices are designed to move on guide tracks. The amount of polymer deposit can be regulated from chamber to chamber. For a discontinuous polymer discharge, a single feed manifold can be utilized to fill transfer chambers.

With the specified amount of polymer in the transfer chamber, the transfer device is moved on a linear guide transport system until it is aligned with the selected clamping station. A motor driven rack and pinion, pulley, conveyor drive or other suitable method can be used to provide linear motion. The clamping station holds one or more molds and provides the opening and closing sequence needed to produce and remove a finished part. Individual or multiple clamp stations can be aligned with the transfer device. To deposit the polymer, an exit port seal on the transfer device is partially or fully opened and pressure applied using a forward moving ram within the chamber. The shape of the exit port determines the shape of the exiting polymer. The ram is arranged to move in a horizontal direction to keep a low vertical profile on the transport device.

The polymer can be discharged into the mold of a vertical acting press by using one of several techniques or systems. A film, fabric, foil, scrim, felt or other suitable carrier transport passes in close proximity to the exiting polymer stream and carries the combined materials to the mold opening using supporting conveying attachments. Where two or more clamp stations are in series, two or more carriers move the combined materials to the correct mold location. Serial presses can produce a part that spans each clamp station. The press closes against the carrier and polymer to replicate the shape of the mold cavity and core. Alternately, the carrier can be supported by a second carrier which aids in transporting the materials into the press, then separated from the first carrier prior to the press close sequence.

The transport device moves into the clamping station to the opposite side of the mold. As the transport device retracts, polymer is deposited into the mold. The speed of retraction, chamber exit gap and length opening, and ram pressure control the rate of polymer deposit.

The transport device moves into the clamping station to the nearest side of the mold. As the transport device moves forward, polymer is deposited into the mold. Upon completion of the forward stroke, an insert can be placed on the deposited polymer. The transport device retracts, depositing additional polymer over the insert. The press closes after the transport device clears the mold to form an encapsulated composite structure.

The transport device moves into the clamping station to the opposite side of the mold. A film, fabric, foil, felt or other suitable insert is positioned below the transport device and over the mold opening. As the transport device retracts, polymer is deposited on the insert. The mold can be designed to create a seal prior to complete closure to evacuate trapped gases.

For each of the above discharge methods, an insert such as a film, foil, fabric or other shape, can be positioned above the melt stream in the mold to be laminated to the exposed melt side during the closing of the mold.

Because transport devices can travel along parallel paths, two can be aligned in series. In such an arrangement, a carrier passes under and collects deposited polymer from both units. As the carrier moves from one deposition point to the other, an insert can be placed or laminated to the exposed polymer side, then coated with the second deposition. Each transport device can deposit a different type of polymer or polymer composite. A second carrier can be positioned under the first carrier to provide additional support. The second carrier would separate from the first carrier prior to closing of the press. An insert such as a film, foil, fabric or other shape can be laminated to the exposed surface of the combined deposited polymers prior to or after entering the mold.

For a horizontal acting press, the carrier deposited polymer rotates from a horizontal to a vertical direction and positioned between the open horizontal acting clamp station. The clamp would close to form a part.

In another embodiment, the transport device connects to a second polymer collection chamber which is aligned with a clamping station. A controlled rate of polymer is transferred from the transport chamber to the collection chamber. The collection chamber has a retractable entrance designed to match the mating exit shape of the transport device. The chamber becomes progressively narrower going from the top to bottom. A spool, multiple spools or rolls of continuous fibers, woven fibers or other fiber combinations are drawn into the chamber. Chopped fibers can be fed into the chamber through the same opening. Pressure is applied to the polymer and fibers using one or more sets of rotating impellers or similar pumping methods that apply downward and penetrating forces on the polymer and fiber mix. Baffles can be attached to the walls to reduce back flow of polymer. Space is allowed within the chamber to allow polymer to fill around the fibers. Sprockets, rollers or other suitable mechanisms pull or push the coated fibers out the narrow end of the chamber. The size of the exit opening, fiber position and fiber spacing can be adjusted to control the polymer to fiber ratio and coating thickness on each side. Cut fibers can be realigned using flow disrupting devices such as stationary or reciprocating pins. Continuous fiber lengths can be blanked to the desired charge length. The width of the fiber composite can be adjusted by varying the chamber exit width. The coated fibers can be deposited on a film, fabric, foil, scrim or other suitable carrier that pass in close proximately to the polymer exit location and transported to the mold opening. The shape of the exit port determines the shape of deposited reinforced polymer., For example, a slot opening would produce a sheet or ribbon shape. Within the slot opening, selective wall thickness variations can be controlled by adjusting portions of the exit seal. The clamping station closes to form a finished part.

Where a thicker layer of deposited polymer is desirable, the carrier can collect additional polymer by reciprocating under the depositing polymer chamber, picking up polymer in both directions. An insert can be placed between layers of deposited polymer.

Alternately, the reinforced polymer can be fed directly into a horizontally positioned clamp station by locating the polymer exit just above the open mold. A controlled stream of reinforced polymer exits from the chamber, cut to the desired length and supported during movement between the open mold. The mold halves or sections then close on the polymer.

In a third embodiment, a low surface friction carrier, such as fluorocarbon coated fiberglass cloth or metal foil or other suitable carrier collects deposited polymer from the deposition device and moves into a vertical acting clamping press containing an open mold. Located outside the carrier conveyor, a set of shaping dies are attached to actuators positioned on each side of the carrier. As the dies move forward, they gather and shape the polymer over the mold. The carrier moves away from the dies, exposing the mold cavity. The shaping dies retract while separating the formed polymer deposition which drops into the lower mold section., The mold closes to form the finished part. The dies may be heated.

Where necessary, supplemental heat can be applied to any carrier deposited polymer or polymer composite prior to the mold closure sequence.

DETAILED DESCRIPTION OF THE PREFERRED EMBODIMENT

Figure 1:
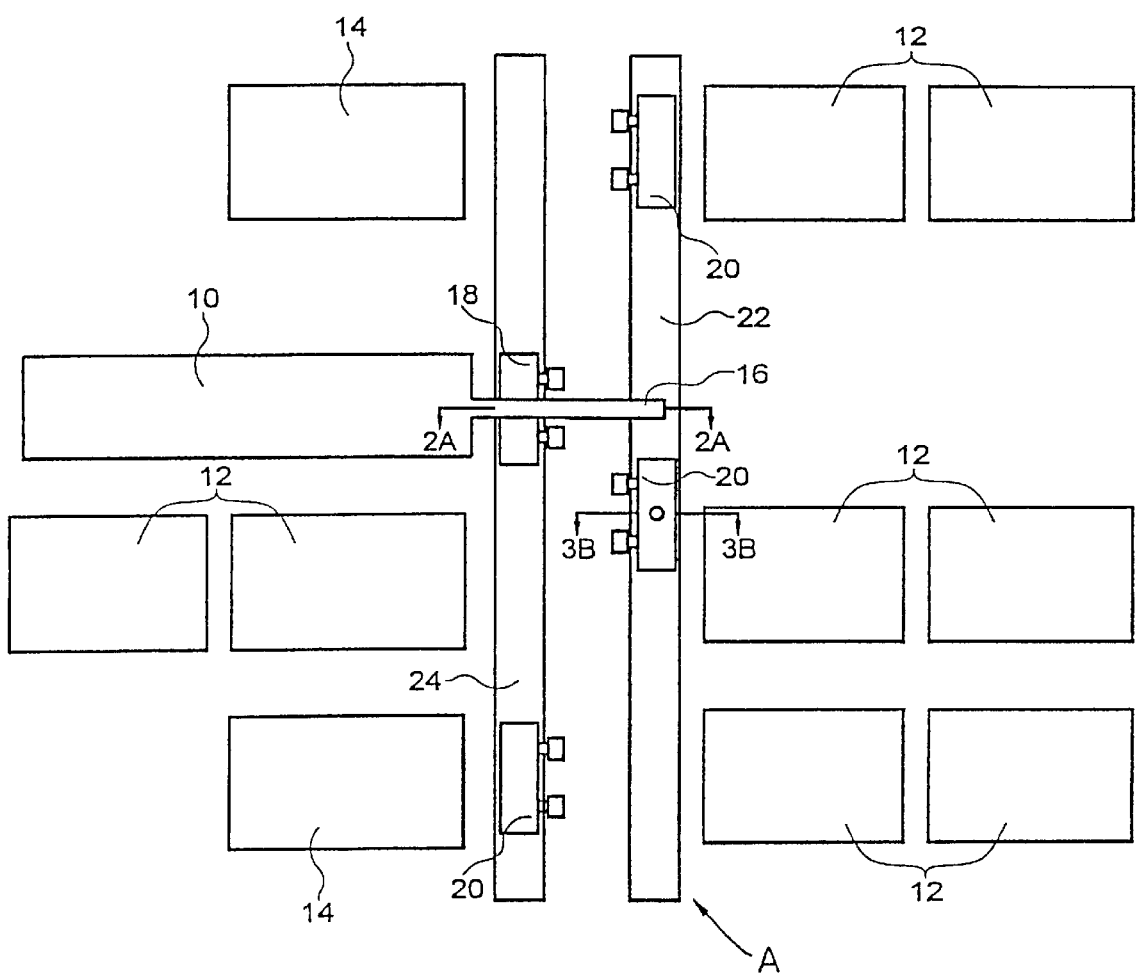
FIG. 1 is a schematic top view of the components that make up the transfer deposition device.

Referring now to FIG. 1, where the polymer transfer and deposition device is designated by the letter A. It includes plasticating machine or extruder 10 shown with remotely located combinations of multiple or a plurality of clamp stations 12 and a plurality of single site clamping stations 14. A dual outlet polymer distribution manifold 16 with shut off controls 28 for each outlet 30 is attached to the plasticating machine 10 while depositing the plasticized polymer into the chamber of a transport device 18. Additional transport devices 20 are positioned in front of the clamping stations 12 and 14 for returning to the manifold 16 polymer dispensing outlet. The transport device guide or conveyor 22 handles the outer transport movement while transport device guide or conveyor 24 controls the inner transport movement.

Figure 4:
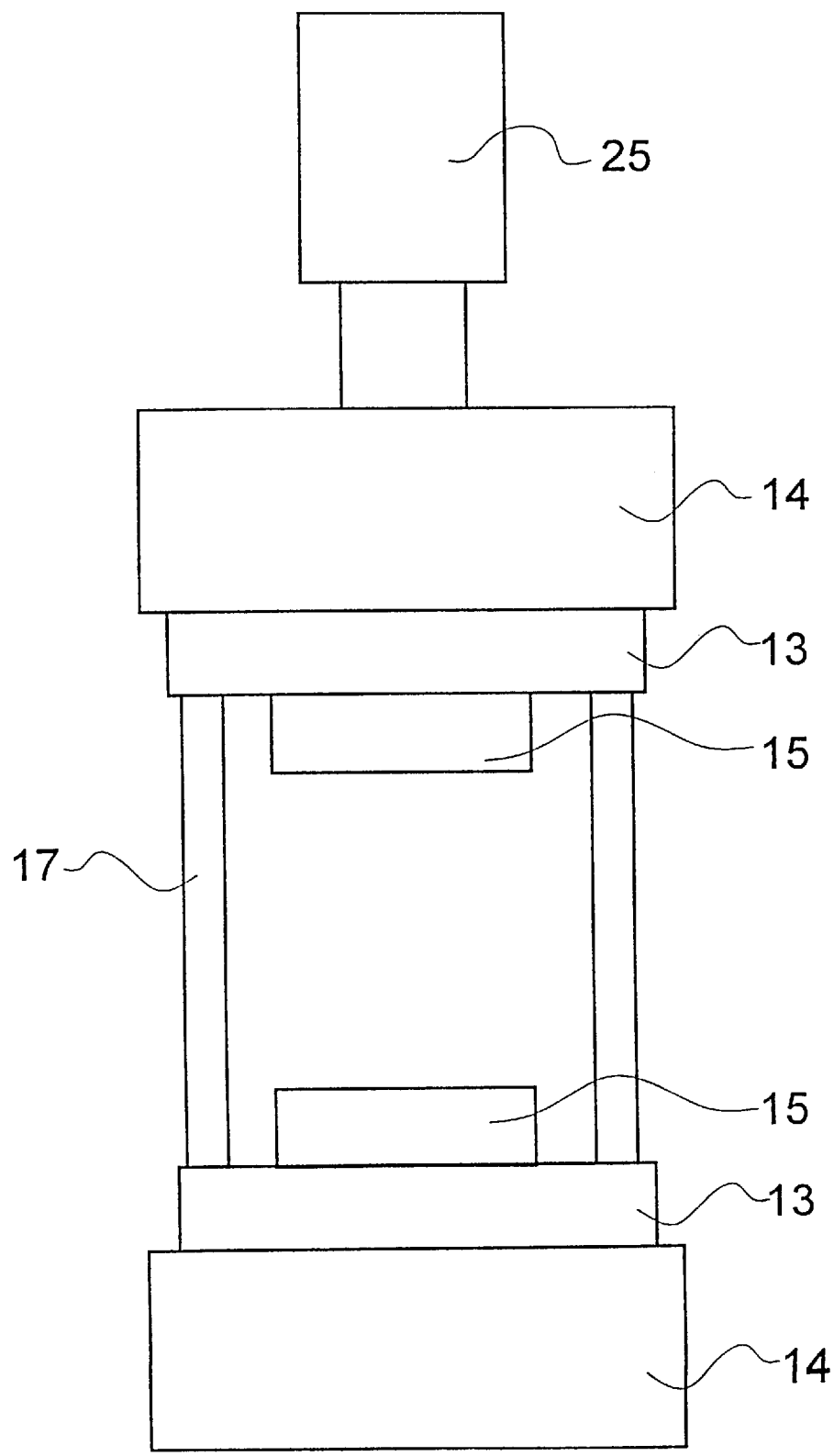
FIG. 4 is a side view of a vertical acting clamping press.

The arrangement or layout of the clamping stations 12 and 14 are for illustrations purposes. As shown in FIG. 4, each vertical acting clamping station 14 includes mold sections 15 which are attached to vertically spaced apart platens 13. A fluid cylinder 25 is attached to the upper platen 13 for moving the platen 13 up and down on the guides 1 7. The size and number of stations can be adjusted to meet a specific requirement.

Figure 3:
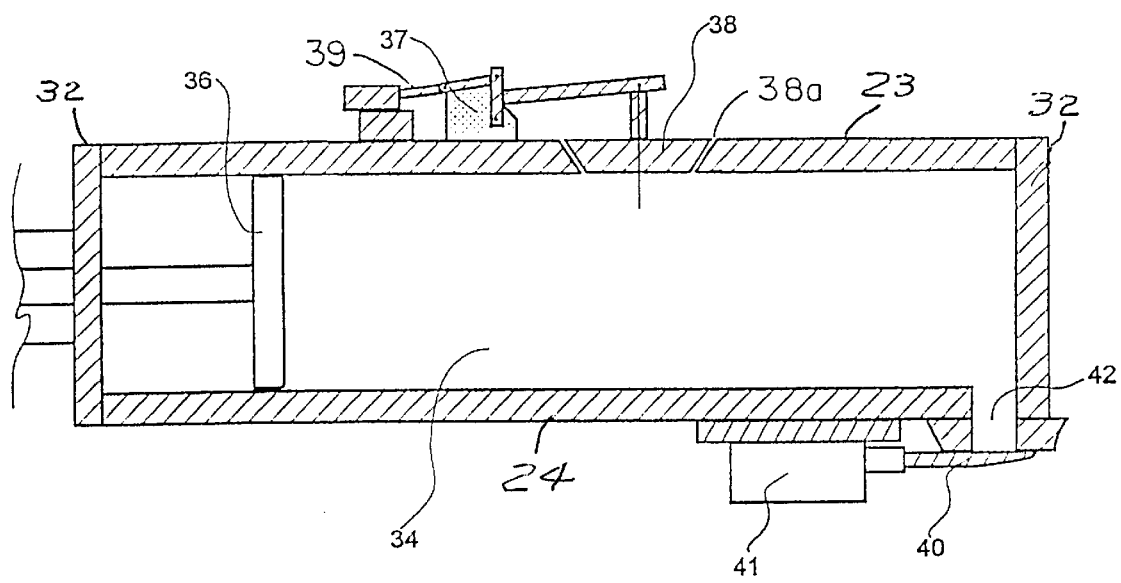
FIG. 3 is a cross-sectional view of the transport device taken along line 3B—3B of FIG. 1.

The four illustrated transport devices 18 and 20 of FIG. 1 are shown with the inner, bottom transport device 20 serving clamping stations 12 and 14 on the bottom left side as illustrated. The top transport device 18 handles the upper left clamping station 14 as illustrated. The two outer transport devices 20 serve the outer top and bottom clamping stations 12 respectively as illustrated in FIG. 1. One or more cylinders are attached to the transport devices 18, 20, providing the pressure to move a ram 36 located within the transport chamber 34, as shown in FIG. 3. The number of cylinders on each transport device 18, 20 depends on the size of the chamber 34. The overall dimensions of chamber 34 and the position of the ram 36 therein determine the available volume within the chamber 34. When a molten polymer is deposited in the transport chamber 34, the transport device 18, 20 is insulated and/or heated. Although not illustrated, necessary electrical, pneumatic and hydraulic components are attached to the transport device 18, 20.

Figure 2:
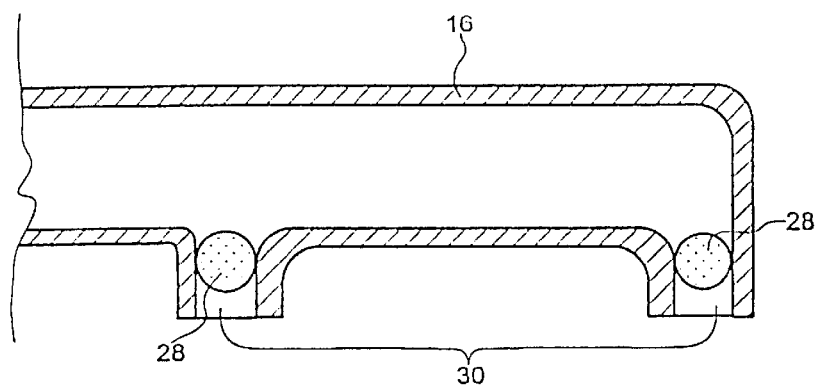
FIG. 2 is a cross-sectional view of the polymer distribution manifold taken along line 2A—2A of FIG. 1.

Referring now to FIG. 2, the polymer distribution manifold 16 has two outlet ports 30 for providing a continuous discharge of the polymer, with alternating on-off shut off devices 28 located at the outlet port 30. When the outside transport chamber 34 is collecting discharging polymer, the mating shut off device 28 is in the open position and the inner shut off device 28 is in the closed position. The shut off devices 28 are reversed when the inside transport chamber 34 is collecting polymer.

To allow polymer discharge from the dual outlet manifold 16 into chamber 34 of the transport device 18, 20, a fill port 38 is opened using a toggle lift and rotation clamp 37. As link 39 is retracted, the toggle clamp 37 lifts the port 38 and rotates it away from the opening 38a. In the close position, the toggle clamp 37 locks the fill port 38 in place in opening 38a. To discharge the polymer from the transport chamber 34, seal 40 is retracted using one or more cylinders 41, and the ram 36 pushes against the polymer within transport chamber 34, forcing the polymer out of the exit port 42.

Each movable non-rotatable and hollow transport 18, 20 has a top wall 23, a bottom wall 24 and a pair of end walls 32. The entrance port or opening 38a is located in the top wall 23. The exit port or opening 42 is located in the bottom wall 24.

Figure 5:
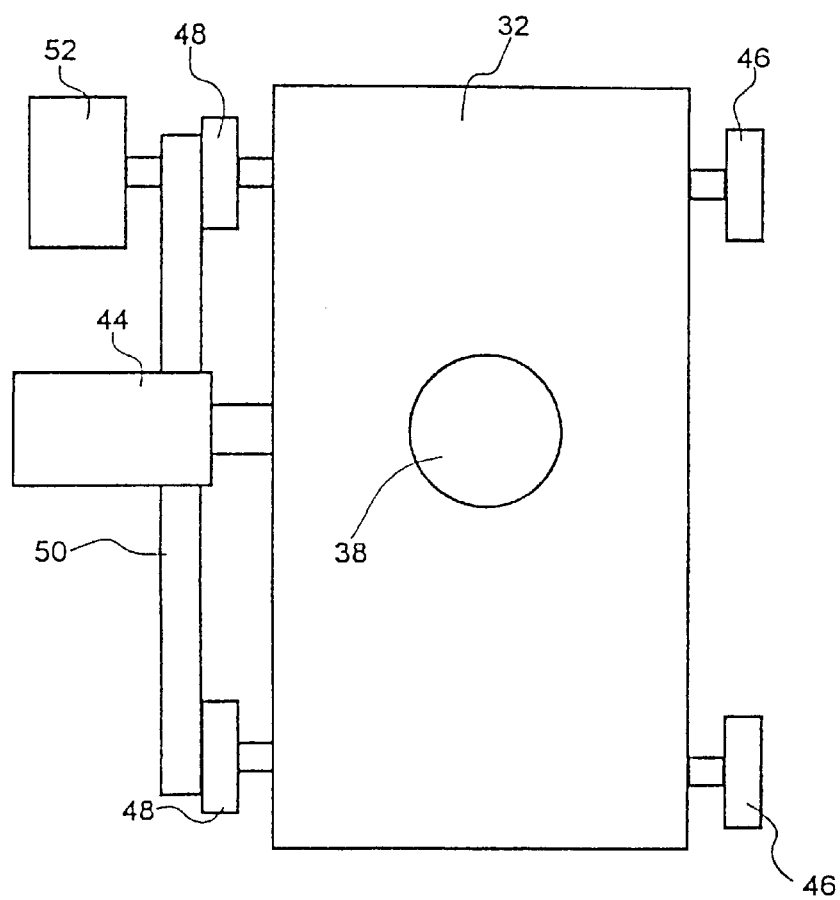
FIG. 5 is a top view of the transport device including the driver mechanism.
Figure 6:
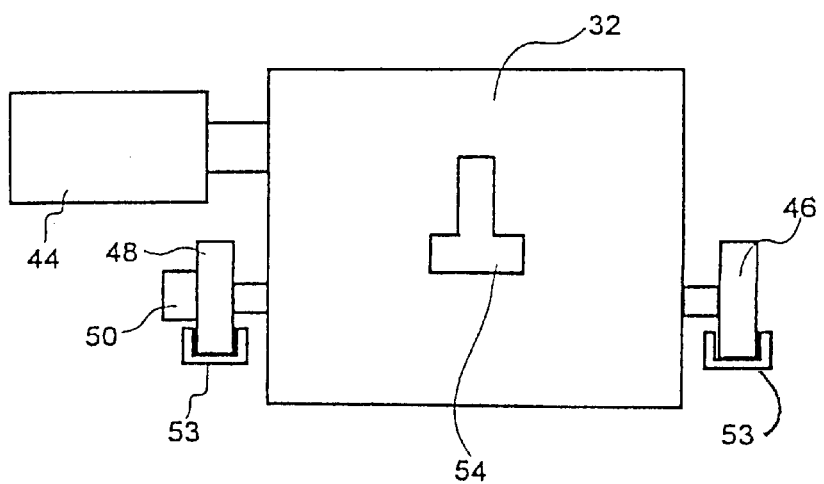
FIG. 6 is an end view of the transport device and transport guide.

The transport device 20 of FIGS. 5 and 6 is provided with attached guide rolls or rollers 46 and 48. Rollers 48 consist of inner sections that move in guide track 53 and connects to the outer pulley sections. Drive belt 50 is attached to the pulleys, not shown, located near each end of the transport device 20. A drive motor 52 provides two directional motions for the transport device 20. Linear encoders are positioned near the guide rails or tracks 53 to locate and control the motion of the transport device 20. Rollers 46 move in the parallel guide tracks 53 as shown in FIG. 6.

Figure 7:
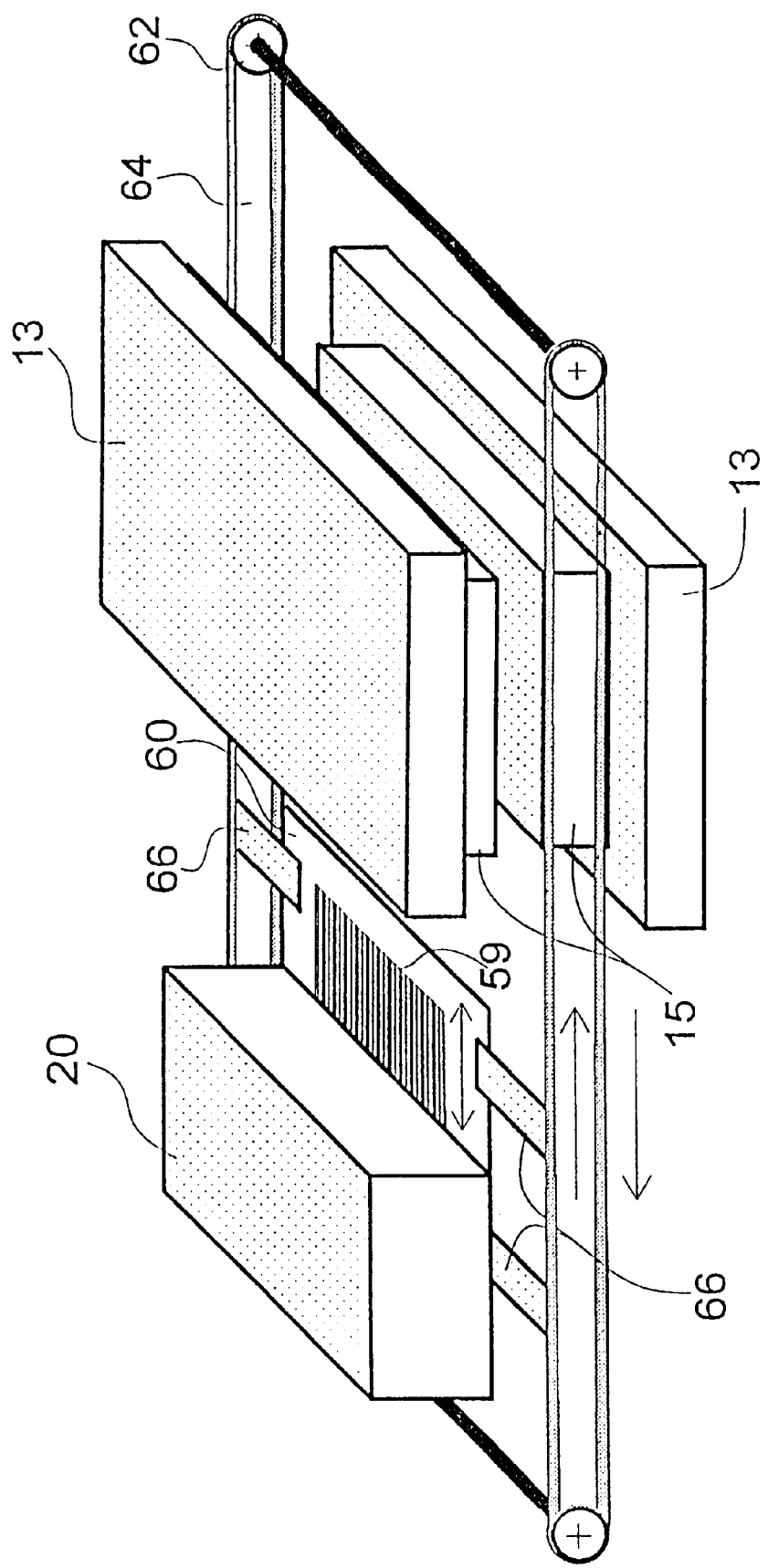
FIG. 7 is a view of the carrier guide and transport device depositing polymer on a carrier that feeds a vertical opening mold.

The preferred carrier 60 for either a horizontal clamping arrangement 56 and 58 (FIG. 8 and 13) or vertical clamping arrangement 13 and 15 (FIG. 7 and 10) is shown, with the carrier 60 secured on both sides by clamps 66 to a set of rotating guides 64. The guides 64 are driven by a driver 62 moving at either a constant or at a variable speed. One or more carriers 60 pass under the transport device 20 where a layer 59 of polymer is deposited onto the carrier 60 and moved between the mold sections. The carrier 60 is in the horizontal position when passing under the transport device 20 where a polymer layer 59 is deposited on the carrier 60. Guides 64 are positioned outside the space occupied by the mold half sections, not shown, in FIG. 10. As the mold closes, the polymer coated carrier 60 is separated from the side clamps 66. The guides 64 can be adjusted to allow the two mold sections to maintain close proximately to each other while feeding the coated carrier 60 between them. Where additional carrier support is required, a second carrier is positioned below the top carrier 60, and separated from the deposited carrier 60 before closing the clamping press, not shown.

Figure 8:
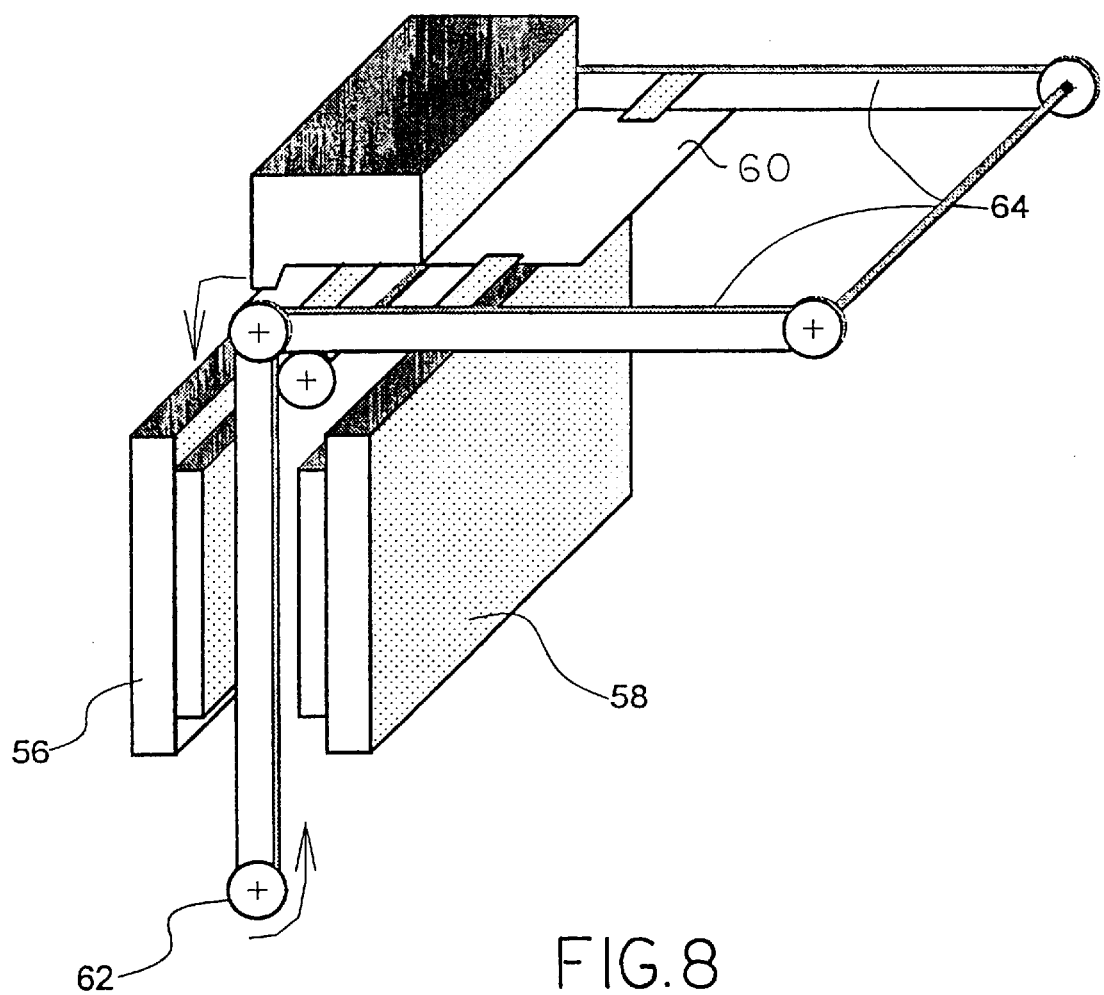
FIG. 8 is a view of the carrier guide and transport device depositing polymer on a carrier that feeds a horizontally opening mold.

Referring now to FIG. 8, for a horizontally opening clamping press, the carrier 60 moves from the horizontal coating position to a vertical position prior to entering the open sides or sections 56, 58 of the mold.

Figure 10:
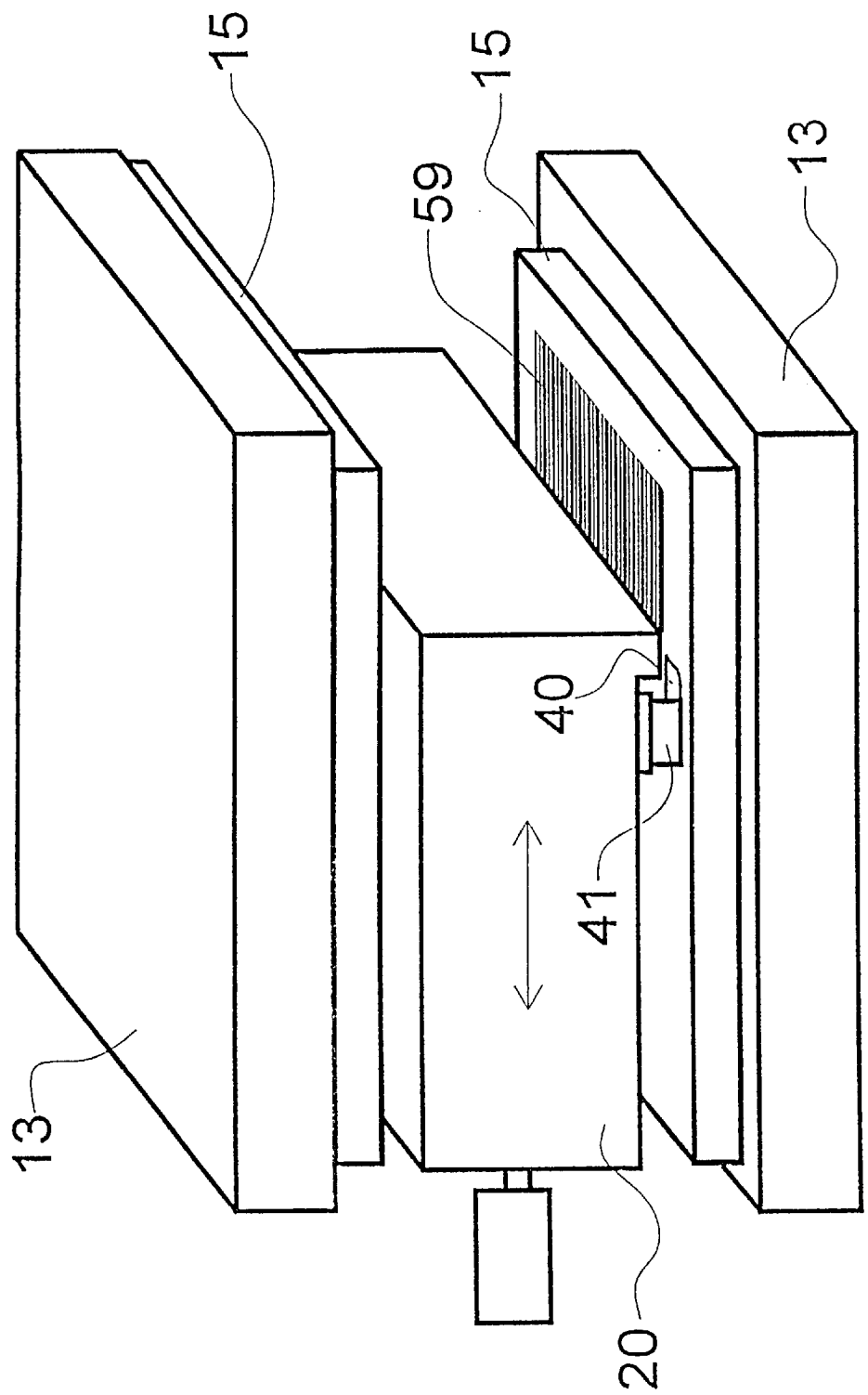
FIG. 10 illustrates a polymer transfer and deposition device depositing polymer within a vertically active clamping station or press.
Figure 11:
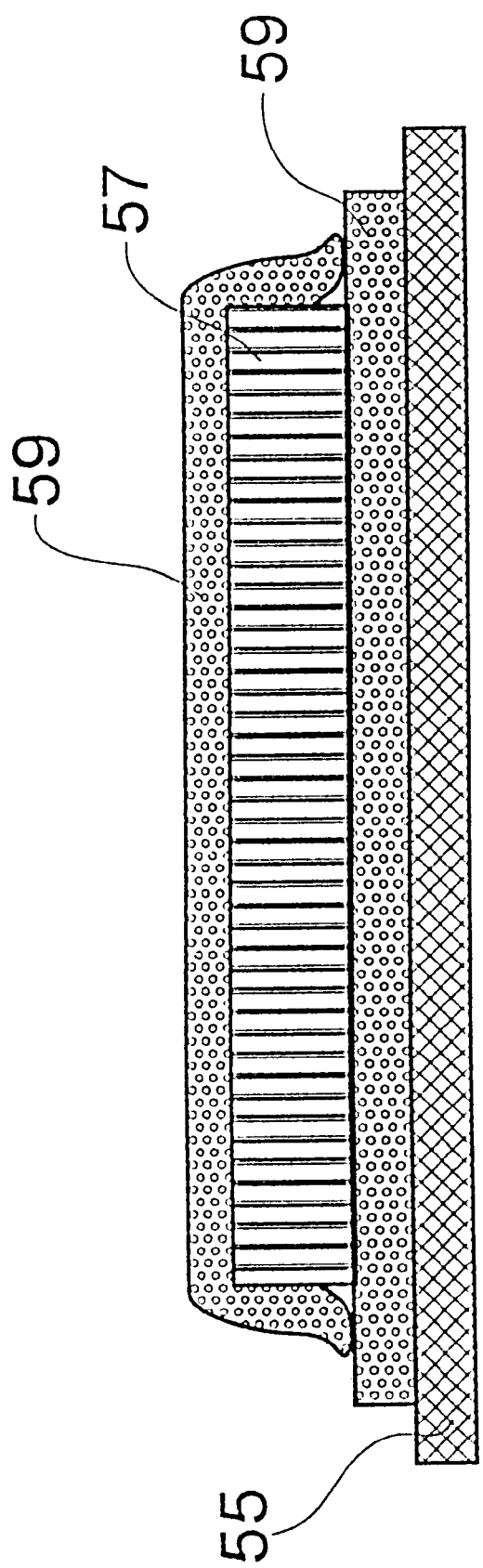
FIG. 11 is a cross-sectional view of inserts placed below and between deposited polymer.

In FIG. 10, the polymer transfer and deposit device 20 is depositing polymer 59 directly into the bottom half of mold 15 attached to platen 13. Seal 40 is open during deposition. The transfer and deposit device can deposit polymer during the forward stroke, reversing stroke or in both stroke directions. An insert may be placed below the deposited polymer or between deposits or below and between deposits. FIG. 11 is a cross-section of an insert 55 below deposited polymer 59 and insert 57 captured between deposited polymer 59.

Figure 9:
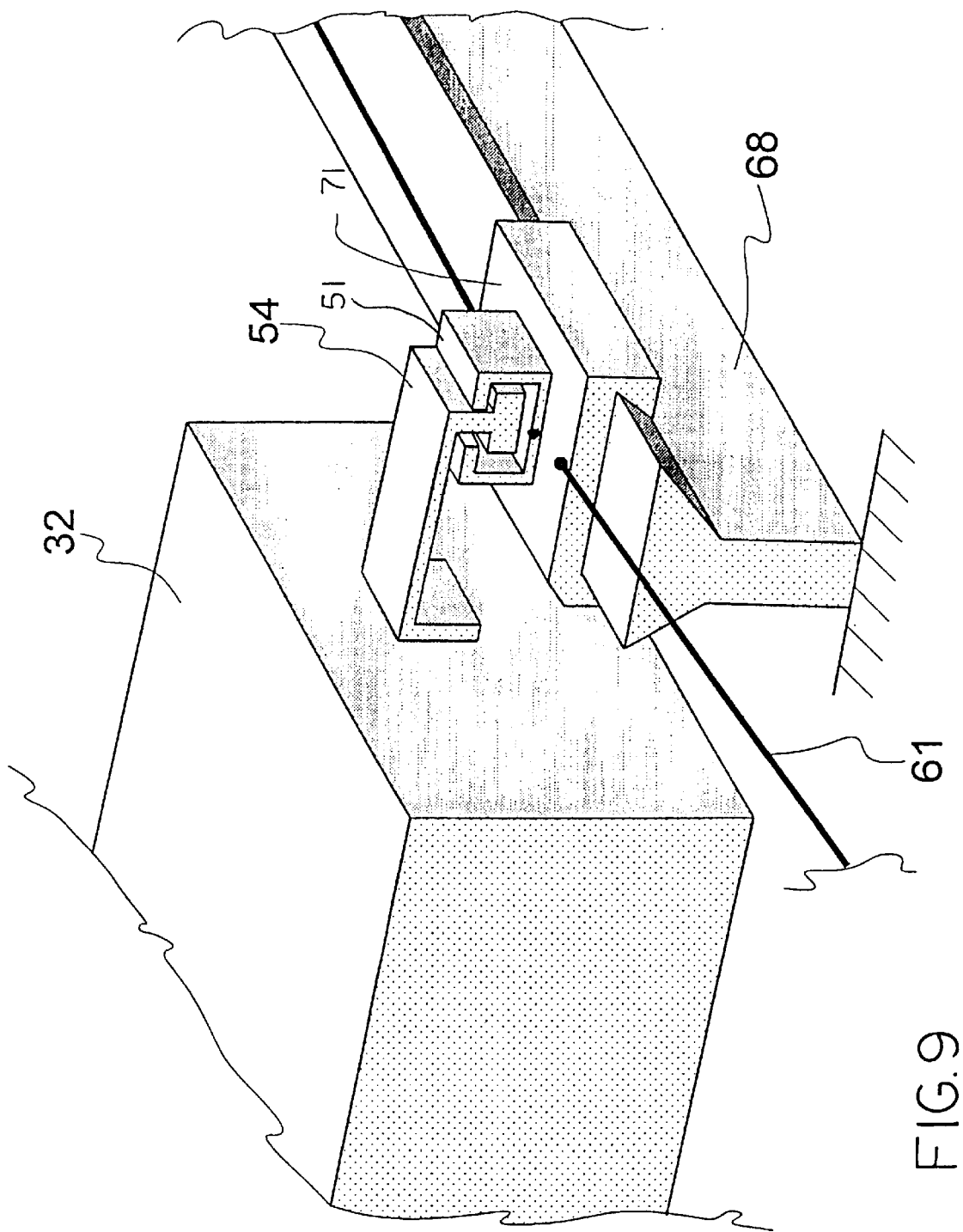
FIG. 9 is a partial view of the transport device attached to a slide system within a clamping station.

For direct deposit of a layer of polymer into a vertical acting clamping press (FIG. 7), the transport device 20 is shuttled forward from the traversing transport device guides 22 or 24 while keeping the exit port 42 (FIG. 3) aligned with the clamping stations 12 or 14. As shown in FIG. 9, one of the two outboard guide carriers 71 is shown. The guide carriers 71 support and direct the transport device 18, 20, moving on linear guide tracks 68, located outside the mold and polymer carrier guide space 64. Guide attachment 54 is positioned in a locking clamp 51 mounted on carrier 71 that holds and maintains alignment of the transport device 18, 20 while the guide carriers are moving on the guide tracks 68. One or both of the guide carriers 71 are attached to a drive cable 61 which drive and position the transport device 18, 20 within the clamping press.

Figure 12:
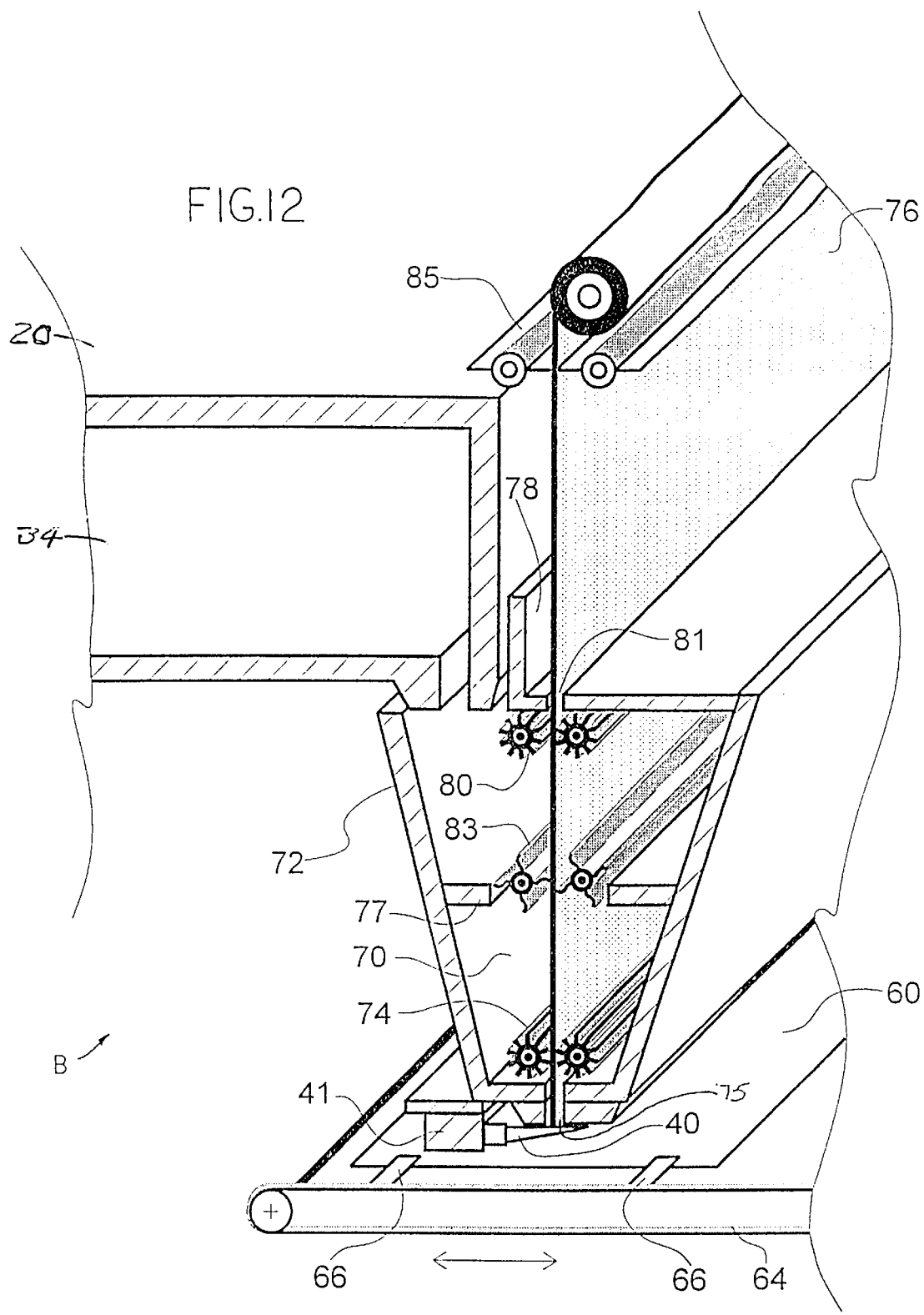
FIG. 12 is a partial cross-sectional view of the transport device mated to the polymer collection chamber, a roll of fiber being drawn into the chamber and a carrier passing below the chamber.

In another embodiment, the polymer transfer and deposition device designated by the letter B of FIG. 12 shows the transport device 20 aligned with the top of a polymer collection device 72. As the transport device 20 moves forward to combine with the collection device 72, a hinge 78 is pushed to open a space 70 where polymer, located in chamber 34, can be deposited into the collection chamber 72 at a controlled rate. A roll or spool of fiber 76 unwinds and moves through an opening 81 located near or on top of the polymer collection device 72.

A set of drivers 80 pull the fibers 76 into the chamber 72 at a controlled rate. The drivers 80 can move the fiber 76 in a continuous or discontinuous manner. A set of rotating impellers 83 apply inward acting force to the polymer and fibers or fiber mix. Baffles 77 are laterally spaced apart from impellers 83. Once the polymer transport device 20 has delivered a set amount of polymer, it retracts, allowing hinge 78 to close, and returns the transport device to the plasticating machine 10 where more polymer can be deposited into chamber 34. The exit position 75 of the polymer coated fiber is adjustable to control the ratio of polymer to fiber. The exit position 75 opening is controlled by seal 40 attached to one or more pistons 41. Seal 40 has a blade edge that can cut the existing polymer composite to any desired length. The existing polymer composite can be deposited on carrier 60 and moved into a clamping station. Cutters 85 chop fibers to any desirable length. The collection device 72 can be moved on a track system that is similar to the method used to guide the transport devices 18, 20 to the various clamp stations 1 2 and 14.

Figure 14:
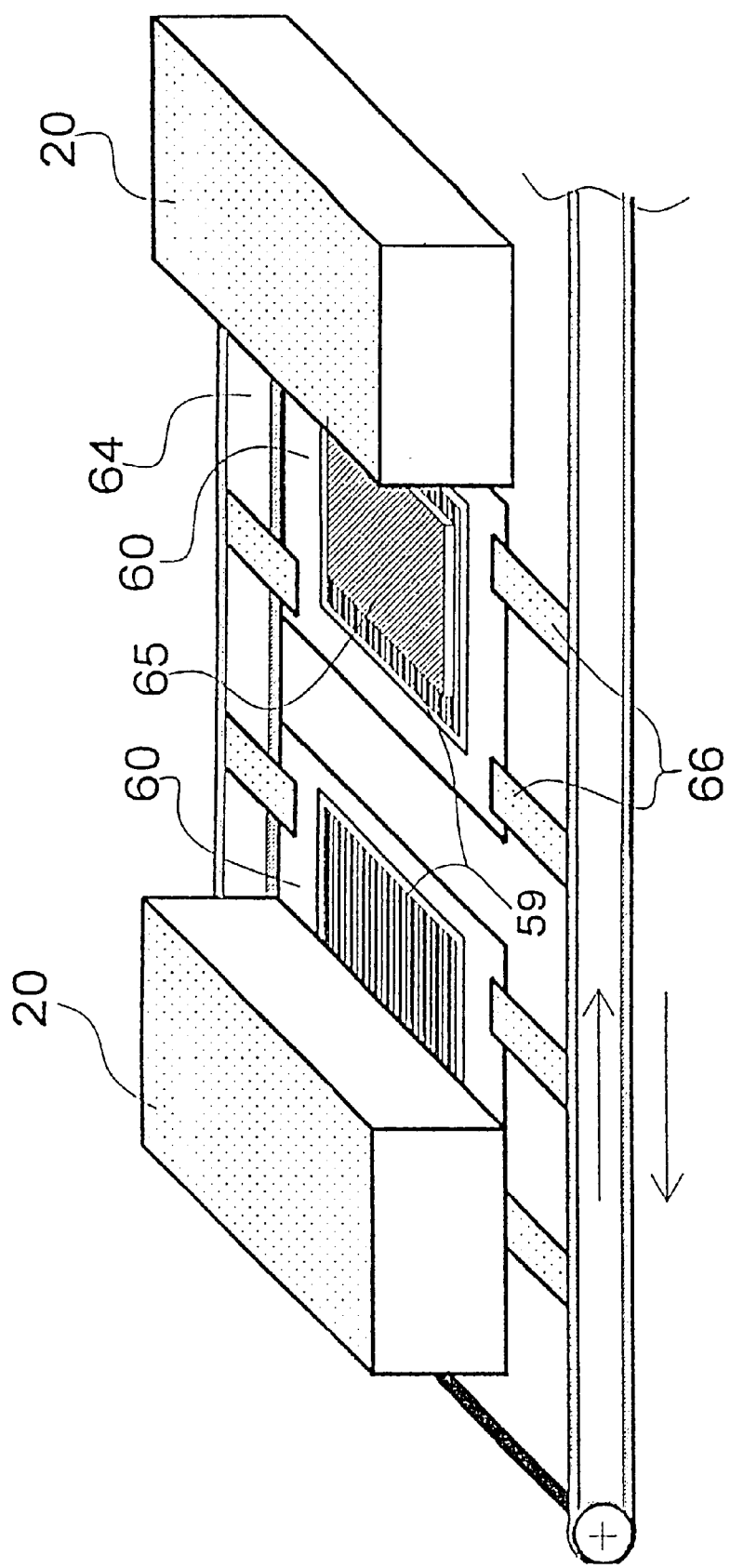
FIG. 14 illustrates a pair of polymer and deposition devices in series, with an insert placed between the deposits.

FIG. 14 shows two polymer and deposition devices 20 in series and insert 65 placed over the first deposit 59 prior to entering the second deposition station 20. A double carrier 60 is illustrated in FIG. 14. Each carrier could align with separate clamping stations or mold cavities. Each device 20 could deposit the same or different polymers.

Figure 15:
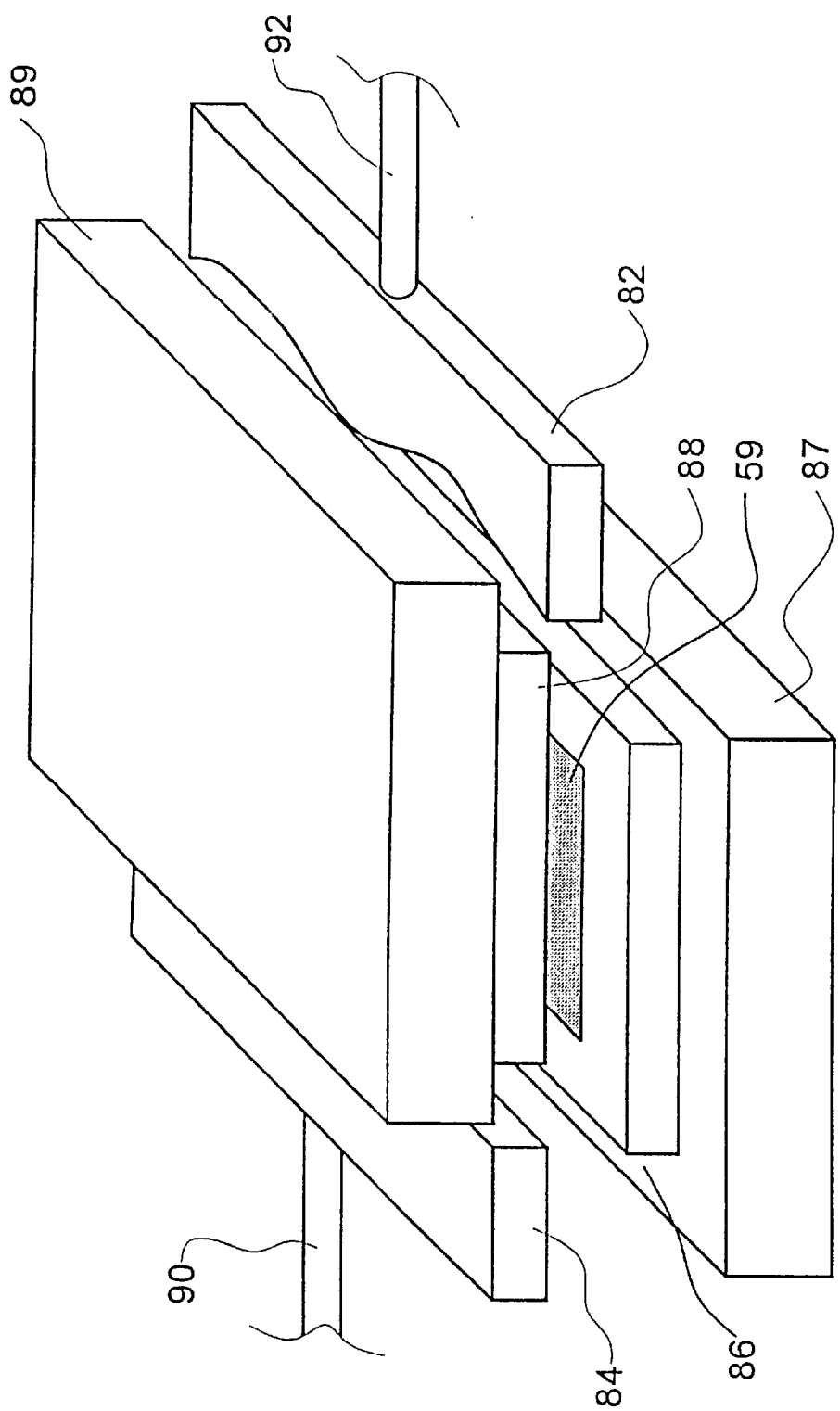
FIG. 15 is a view of two forming dies located at the clamping station.
Figure 16:
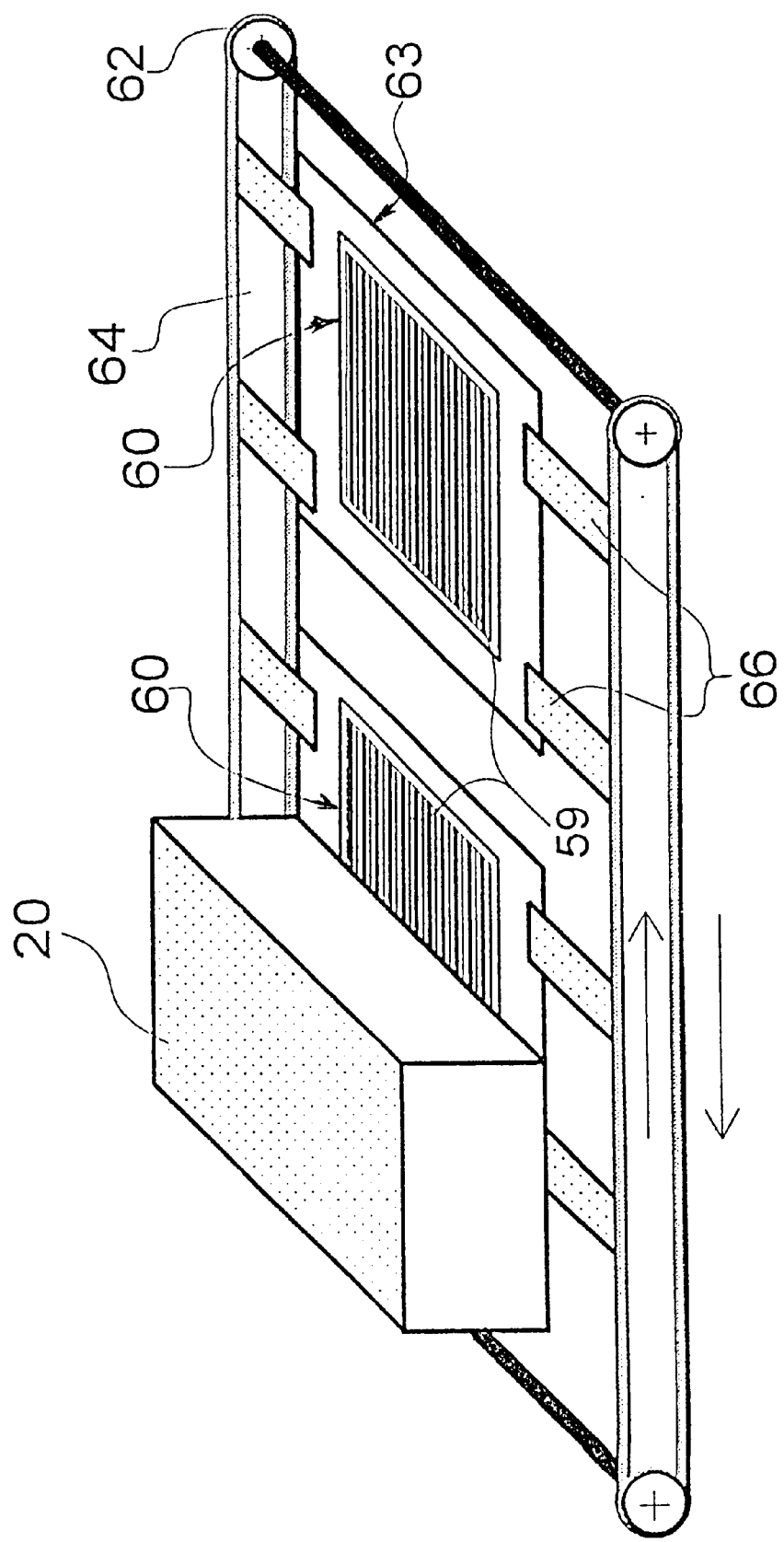
FIG. 16 illustrates polymer placed on a low friction carrier which is supported by another carrier.

Another embodiment utilizes a low surface friction carrier such as described in FIG. 16, where the top surface of carrier 60 would have low friction characteristics or a low surface friction carrier 63 placed between the carrier 60 and the deposited polymer 59. A layer of polymer is deposited on the carrier 60 and the combination indexed into a vertical clamping press and positioned over the bottom portion of an open mold. FIG. 15 shows two forming dies 82 and 84 attached to actuators 92 and 90 respectively. The forming dies 82 and 84 are aligned perpendicular to the movement direction of the carrier 60 and in line with the mold or die sections 86 and 88 which are attached to vertical acting clamps 87 and 89. With the polymer aligned with the forming or shaping dies 82 and 84, the dies are pushed forward by the actuators 90 and 92 where they capture and rearrange the shape of the polymer to conform to the desired shape represented in the die contact areas. The carrier 60 indexes away from the polymer captured in the die sections 86, 88. The two forming dies 82 and 84 retract out of the mold area, forcing the shaped polymer to deposit within the mold section 88.

Figure 13:
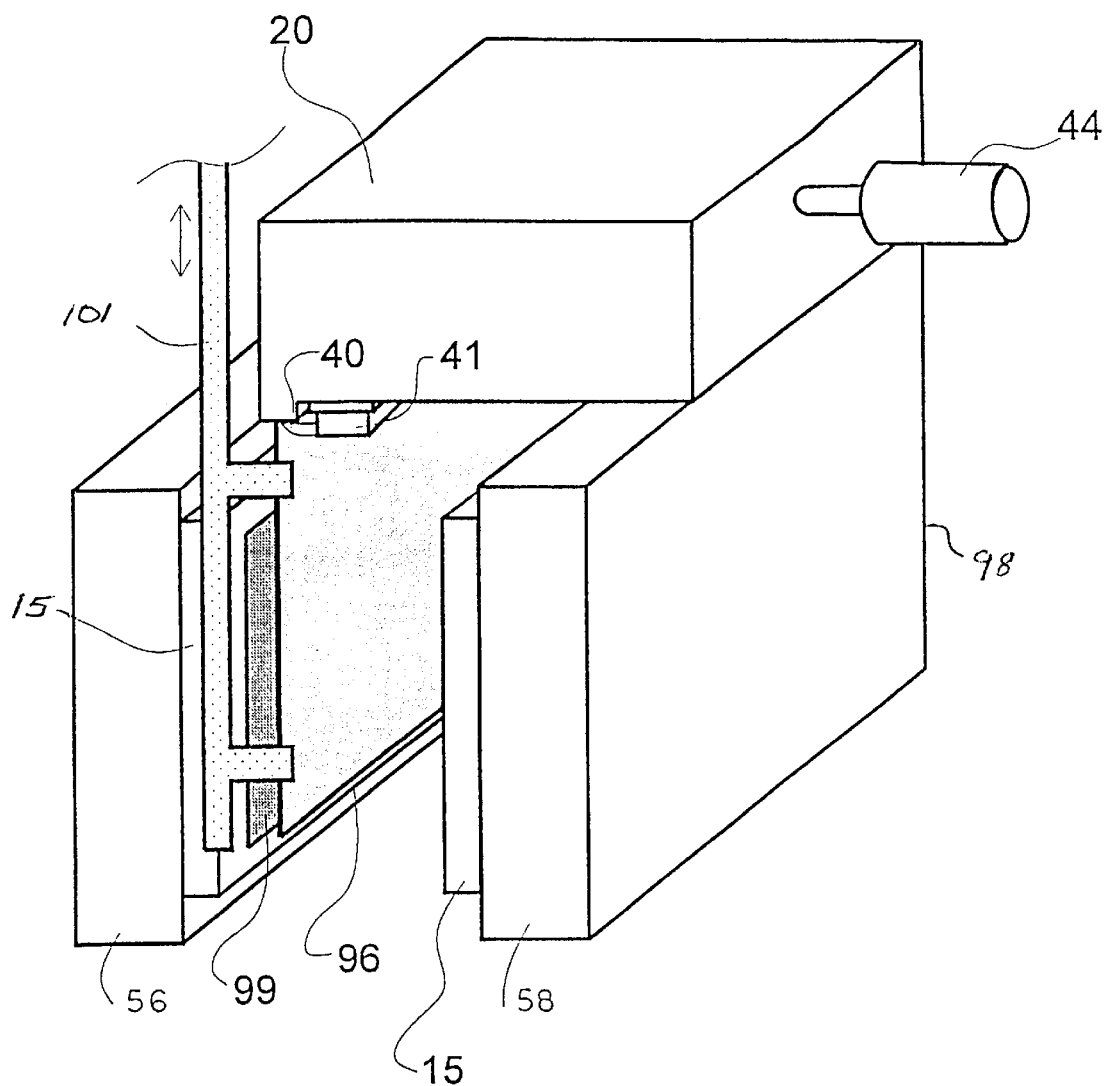
FIG. 13 is a perspective view of the transport device depositing polymer between molds attached to a horizontally opening clamping station.

For direct deposition of a polymer or polymer composite into a horizontal clamping station, FIG. 13 shows the transport device 20 positioned directly over an open mold 98 attached to horizontally opening clamping platens 56, 58. The transport device 20 feeds a polymer stream 96 between the mold platens 56, 58. Deposit 96 is blanked to the desired length and is supported during movement between the open clamping platens 56, 58 of the mold. Where polymer is deposited directly into horizontal opening clamping press, FIG. 13 shows a clamping device 101 that holds the exiting polymer 96 until the mold half's 15, attached to platen 56, 58, close on the polymer. The clamping device 101 moves down at the same rate as the existing polymer.

Figure 17:
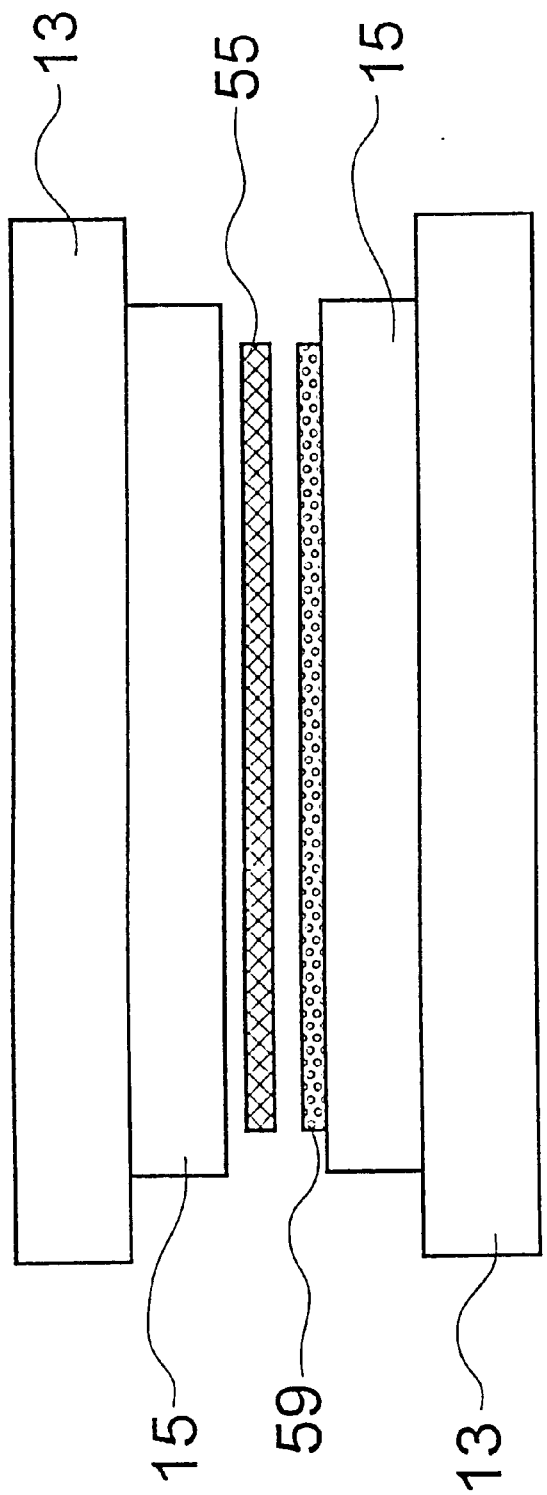
FIG. 17 is a cross-sectional view of an insert placed over deposited polymer within a clamping station.

Independent of the method of deposing polymer within a clamping station, an insert 55 can be positioned above exposed polymer prior to closing the clamps. FIG. 17 shows a cross-section of an insert 55 positioned over deposited polymer 59 while the mold 15 and attached platens 13 are still in the open position.

Figure 18:
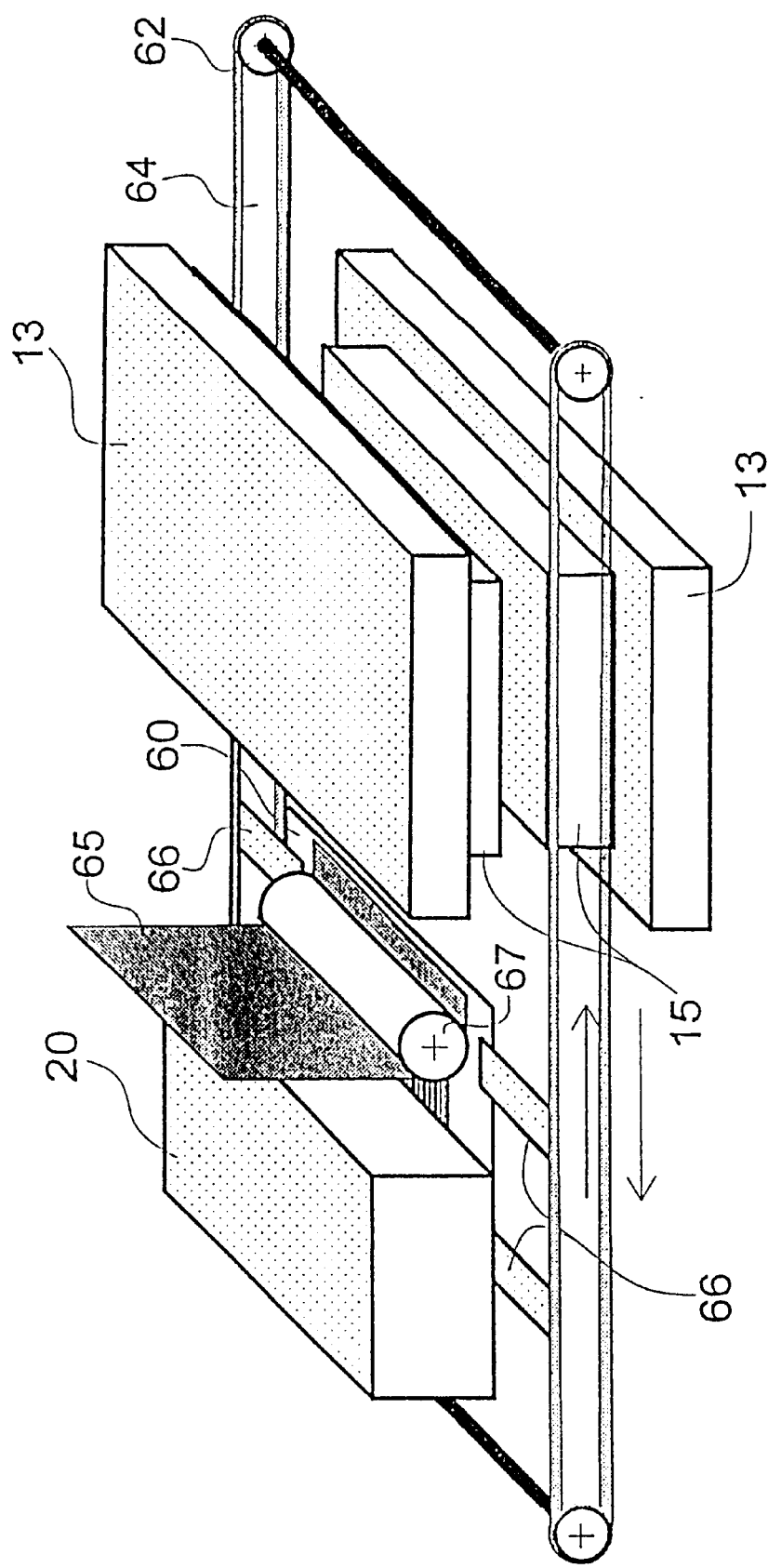
FIG. 18 illustrates a clamping station with an insert being laminated to a polymer deposited on a carrier prior to entering a clamping station.

Whenever a carrier 60 is utilized under a deposition device 20 or 72, an insert can be laminated to an exposed side of the polymer using a laminating device such as a roller 67 as shown in FIG. 18 prior to entering a clamping station illustrated by clamps 13 and mold 15.

Figure 19:
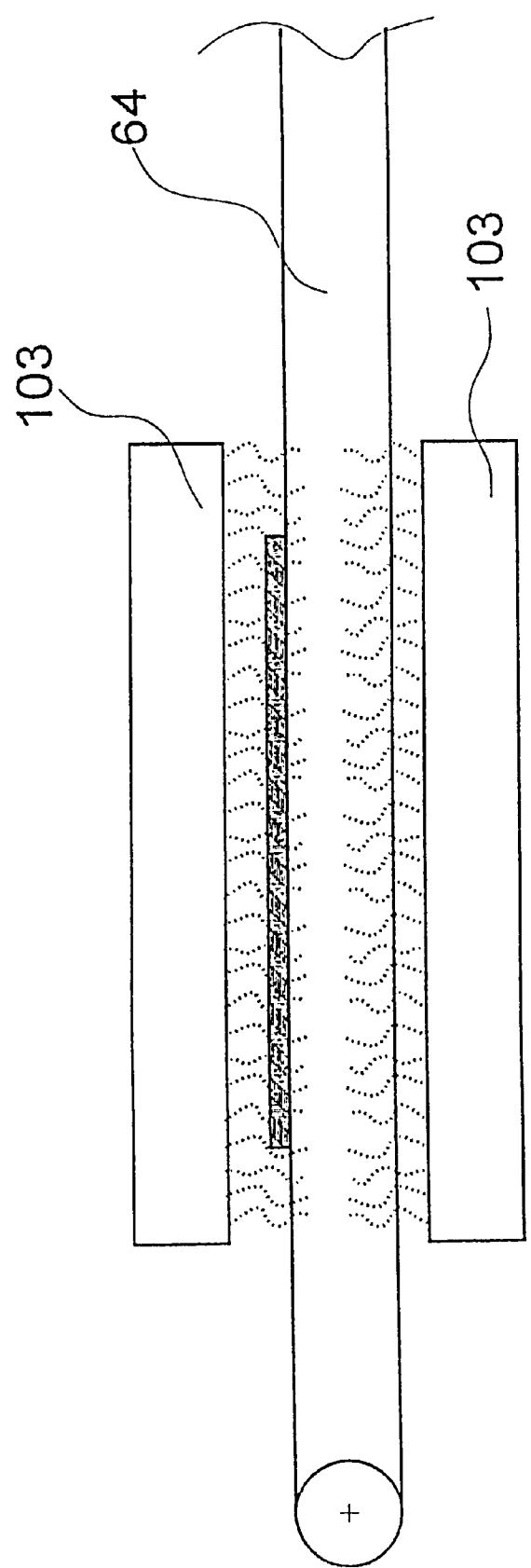
FIG. 19 illustrates a carrier provided with a two sided heat source, showing a cross-section of a polymer deposited on the carrier and passing between the two sided heat source.

For carrier deposited polymer within a clamping station, the polymer can be exposed to external heat prior to entering the clamping station. As shown in FIG. 19, heat source 103 provides heat to a polymer being transported to a clamping station.

The invention described above may be modified or have changes made to it within the scope of the invention as defined by the attached claims.

What I claim is:

1. A polymer transfer and deposition device comprising: a polymer plasticating machine for providing a flow of polymer; a discharge device connected to said plasticating machine containing one or more valves to shift the discharged polymer from one or more positions; a movable non-rotatable, hollow transport device, separate and independent from said plasticating machine, said transport device including top and bottom walls and a pair of end walls, an entrance port in said top wall and an exit port in said bottom wall; said transport device when said entrance port is aligned with one of said valves of said discharge device accepting deposited polymer from said plasticating machine; a ram located within said transport device for moving the deposited polymer towards said exit port; and a conveyor for moving the transport device into alignment with said discharge device and one or more locations where said ram discharges the polymer through said exit port.

2. A polymer transfer and deposition device of claim 1, wherein said plasticating machine provides for a continuous flow of polymer.

3. A polymer transfer and deposition device of claim 1, wherein said plasticating machine provides for a discontinuous flow of polymer.

4. A polymer transfer and deposition device of claim 1, where one or more carriers are provided which receive deposited polymer from said transport device and move the polymer into a molding station.

5. A polymer transfer and deposition device of claim 4, wherein the molding station has a pair of vertically acting mold sections.

6. A polymer transfer and deposition device of claim 4, wherein the molding station has a pair of horizontally acting mold sections.

7. A polymer transfer and deposition device of claim 1, wherein there are a plurality of molding stations, with each station having either a pair of vertically acting mold sections or a pair of horizontally acting mold sections.

8. A polymer transfer and deposit device of claim 1, wherein the ram of said transport device has a forward stroke and a reversing stroke, said transport device depositing polymer directly into a mold during either the forward stroke, reversing stroke or in both stroke directions.

9. A polymer transfer and deposition device of claim 4, wherein two transport devices are arranged in series, each transport device having a chamber, said carrier being located below said transport devices, said carrier passes below said two transport devices, with the chamber of each transport device depositing the same polymer or different polymers or polymer composites on said carrier.

10. A polymer transfer and deposition device of claim 1, wherein the polymer is deposited in one or more molds located in one or more clamping stations using one or more transport devices.

11. A polymer transfer and deposition device of claim 1, wherein a low surface friction transport carrier or release carrier or a transport carrier is provided which receives the deposited polymer; a set of shaping dies; two way actuators connected to said shaping dies which are located at a clamping station without interfering with the carrier motion; said shaping dies when actuated, moving forward into the carrier, collecting and capturing the polymer and releasing the carrier between said shaping dies resulting in a movement of the low friction or transport carrier away from the captured polymer where the formed polymer is released into a mold upon separation of said shaping dies.

12. A polymer transfer and deposition device of claim 4, wherein said carrier moves under the transport device one or more times and upon which said polymer is deposited on said carrier.

13. A polymer transfer and deposition device of claim 4, wherein a heat source is provided to expose said polymers deposition on said carrier to external heat before said molding station closes.

14. A polymer transfer and deposition device of claim 1, wherein said polymer deposits into a pair of horizontally acting mold sections using clamp supports.

15. A polymer transfer and deposition device comprising: a polymer plasticating machine for providing a flow of polymer; a discharge device connected to said plasticating machine containing one or more valves to shift the discharged polymer from one or more positions; a transport device, separate from said plasticating machine, said transport device accepts deposited polymer, moves to another location and discharges the polymer; a conveyor for moving the transport device to one or more locations; a polymer collection chamber with an entrance and an exit located adjacent said transport device and accepts deposited polymer from said transport device; an opening in said collection chamber to allow fibers to enter said collection chamber; one or more rotating impellers to apply pressure to the polymer and fibers; one or more drivers to push or pull the fibers through the polymer in said collection chamber; and a discharge opening in said collection chamber that allows polymer coated fibers to be discharged from the exit end of said collection chamber.

16. A polymer transfer and deposition device of claim 15, wherein said collection chamber has a narrower configuration at said exit.

17. A polymer transfer and deposition device of claim 15, wherein a cutting or blanking device is provided which is capable of cutting the fibers to any desired length.

18. A polymer transfer and deposition device of claim 15, wherein one or more carriers are provided which receive polymer coated fibers from said collection chamber and moves into a molding station.

19. A polymer transfer and deposition device of claim 15, wherein the exit of said polymer collection chamber is adjustable.

20. A polymer transfer and deposition device of claim 15, wherein the exit of said polymer collection chamber is adjustable.

21. A polymer transfer and deposition device of claim 18, wherein two transport devices are arranged in series, each transport device having a chamber, said carrier being located below said transport devices, said carrier passes below said two transport devices, with the chamber of each transport device depositing the same polymer or different polymers or polymer composites on said carrier.

22. A polymer transfer and deposition device of claim 18, wherein said carrier moves under the transport device one or more times and upon which said polymer is deposited on said carrier.

23. A polymer transfer and deposition device of claim 18, wherein a heat source is provided to expose said polymer deposition on said carrier to external heat before said molding station closes.

24. A polymer transfer and deposition device of claim 15, wherein said polymer deposits into a pair of horizontally acting mold sections using clamp supports.

25. A polymer transfer and deposition system comprising: a plurality of molding stations; a polymer plasticating machine independent of said molding stations for providing a flow of polymer; a discharge device connected to said plasticating machine, said discharge device containing one or more valves to discharge the polymer; a plurality of movable, non-rotatable hollow transport devices, separate and independent from said plasticating machine, said transport devices consecutively accepting deposited polymer from said discharge device; and conveyor means for consecutively moving said transport devices into alignment with said discharge device and said molding stations where each transport device deposits the polymer.

26. A polymer transfer deposition system of claim 25, wherein each transport device having a chamber surrounded by top and bottom walls and a pair of end walls, an entrance port in said top wall and an exit port in said bottom wall; said transport devices each having a forward stroke and a reversing stroke, said transport devices depositing polymer directly into the molding stations during either the forward stroke, reversing stroke or in both stroke directions.

27. A polymer transfer deposition system of claim 25, wherein one or more carriers are provided which receive deposited polymer from said transport devices and move the polymer into said molding stations.

28. A polymer transfer deposition system of claim 25, wherein two of said transport devices are arranged in series, each transport device having a chamber, said carrier being located below said two transport devices, said carrier passes below said two transport devices, with the chamber of each transport device depositing the same polymer or different polymers or polymer composites on said carrier.

29. A polymer transfer and deposition system of claim 25, where a plurality of carriers are provided which receive deposited polymer from said transport devices and move the polymer into the molding stations.

30. A polymer transfer and deposition system of claim 25, wherein each molding station has a pair of vertically acting mold sections.

31. A polymer transfer and deposition system of claim 25, wherein each molding station has either a pair of vertically acting mold sections or a pair of horizontally acting mold sections.

32. A polymer transfer and deposition system of claim 25, wherein said conveyor means comprises a pair of conveyors arranged in parallel, each conveyor moving one or more transport devices from the discharge device of said plasticating machine to the molding stations.

* * * * *